United States Patent [19]

Trimble et al.

[11] Patent Number: 5,131,231
[45] Date of Patent: Jul. 21, 1992

[54] METHOD FOR OPERATING A CLOSED BRAYTON ENGINE AND ENGINE ADAPTED FOR USE WITH METHOD

[75] Inventors: Steven W. Trimble, Tempe; Robert Bons, Mesa; David M. Mathis, Phoenix, all of Ariz.

[73] Assignee: Allied-Signal, Morris Township, Morris County, N.J.

[21] Appl. No.: 739,938

[22] Filed: Aug. 2, 1991

[51] Int. Cl.⁵ .............................. F01K 25/06
[52] U.S. Cl. ......................... 60/649; 60/650; 60/652; 60/668
[58] Field of Search ............. 60/652, 650, 682, 649, 60/668

[56] References Cited

U.S. PATENT DOCUMENTS 3,859,795  1/1975  Frutschi .................... 60/652
4,439,988  4/1984  Minardi et al. ............. 60/649

OTHER PUBLICATIONS

"Laboratory Evaluation of a Closed Brayton Engine with a Gas Management System", G. D. Duvall, ASME 79-GT-140.

Primary Examiner—Allen M. Ostrager
Attorney, Agent, or Firm—Joseph R. Black; James W. McFarland; Robert A. Walsh

[57] ABSTRACT

A process for operating a closed Brayton-cycle engine (14) at two substantially different levels of output power by selectively changing the molecular weight of the working fluid, and an engine adapted for use with the process.

20 Claims, 2 Drawing Sheets

FIG. 1 PRIOR ART
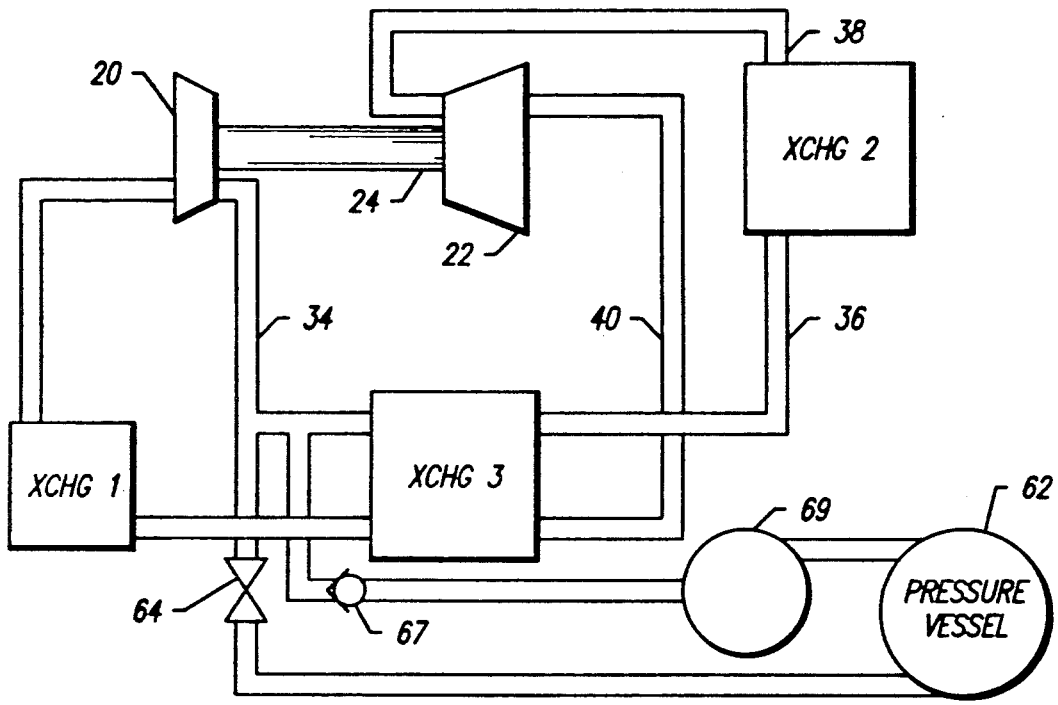
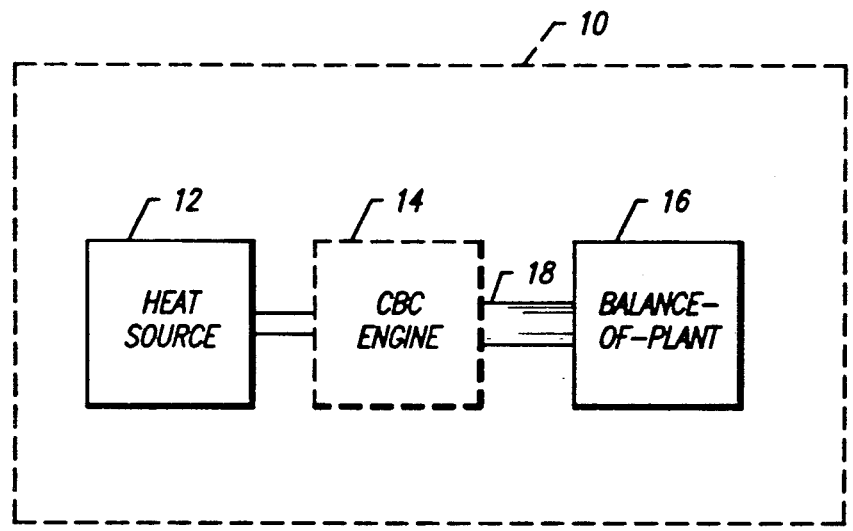
FIG. 2

METHOD FOR OPERATING A CLOSED BRAYTON ENGINE AND ENGINE ADAPTED FOR USE WITH METHOD

TECHNICAL FIELD

The present invention relates generally to power plants and more specifically to Brayton-cycle engines and associated processes. Still more specifically, the invention relates to closed Brayton-cycle engines adapted to operate under conditions of both low output power and high output power, and to processes for operating such engines.

BACKGROUND OF THE INVENTION

Closed Brayton-cycle (hereinafter "CBC") engines provide well known advantages over open-cycle engines, including high efficiency over a relatively wide power range. The latter advantage is normally realized by changing the inventory of the working fluid. The change in inventory is effected by increasing or decreasing the total mass of a working fluid of fixed composition. This known method of increasing engine output from part-power to full power is illustrated in FIG. 1. In the illustrated scheme, heat transfer rates and temperatures are maintained constant at various stages of the engine cycle to obtain maximum efficiency. Pressure variations are effected by injecting additional working fluid into the flow path or extracting working fluid therefrom. This produces a change in mass flow throughout the cycle, and provides the capability of varying engine output power.

The ability to achieve high efficiency over a relatively wide power range makes CBC engines attractive in applications which demand considerably different levels of output power but provide only a limited fuel supply. An exemplary application is a torpedo propulsion system that operates under two conditions of output power to accommodate the cruise and dash phases of the torpedo mission. Both phases of the mission typically consume a large fraction of the available fuel, and any energy savings which can be achieved for the cruise phase is available for consumption in the dash phase or for temporal extension of the cruise phase. Accordingly, the power turndown ratio of the engine (i.e. the maximum power for the given design divided by the minimum power at which high efficiency is maintained) has important tactical consequences in such an application.

An objective of the present invention is to increase power turndown ratios in the forementioned application for CBC engines by a factor of at least 2.0.

SUMMARY OF THE INVENTION

The inventive process achieves the above-stated objective by operating a CBC engine with two gasses of different molecular weight. A first of the two gasses has a higher molecular weight and is used as the working fluid during a first operating condition in which the engine produces relatively low output power. The second of the two gasses has a molecular weight lower than that of the first gas and is used in combination with the first gas as the working fluid during a second operating condition in which the engine produces relatively high output power.

An engine adapted for use with the process comprises two pressure vessels connected to the remainder of the engine so as to enable fluid communication of the first gas between one of the pressure vessels and the cycle flow path, and of the second gas from the other pressure vessel to the flow path.

BRIEF DESCRIPTION OF THE DRAWINGS

FIG. 1 is a schematic illustration of a known CBC engine.

FIG. 2 is a schematic illustration of a power plant comprising a CBC engine in accord with the invention.

DESCRIPTION OF THE PREFERRED EMBODIMENTS

Figure 3:
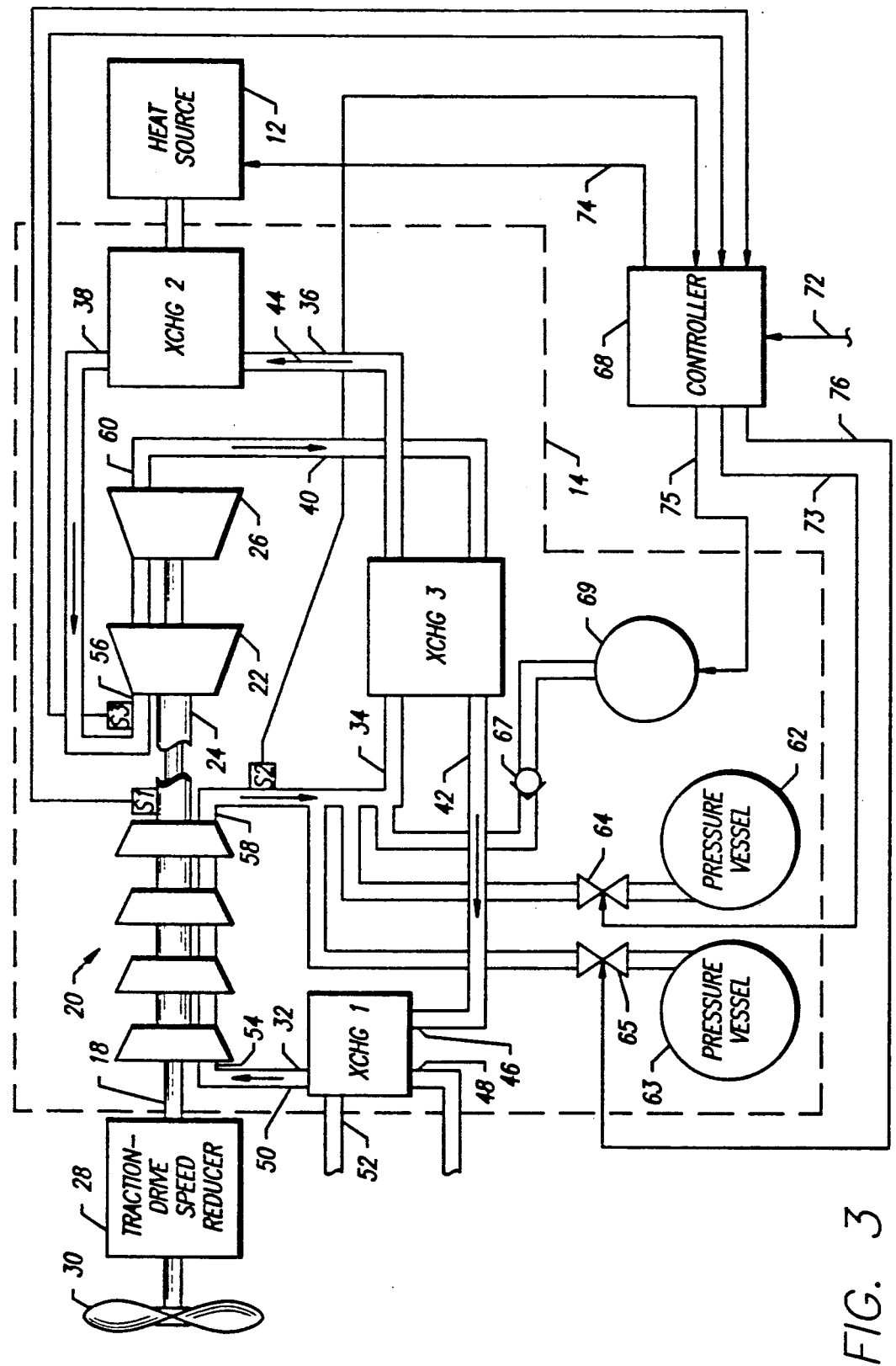
FIG. 3 provides a more detailed schematic illustration of the CBC engine shown in FIG. 2, and illustrates the engine in a contemplated application thereof.

FIG. 2 of the drawings schematically depicts a power plant 10 comprising a heat source 12, a CBC engine 14 in accord with the invention, and balance-of-plant (BOP) components 16. The BOP components 16 will vary with the type of power plant, but typically include such items as a reduction geartrain, a power dissipation element such as a propeller, pumps for lubrication and heat transfer systems, starting components such as a battery and start motor, an alternator, and electronic control elements. The power dissipation element is driven directly or indirectly by the output shaft 18 of the engine 14. Energy for normal engine operation is provided by the heat source 12, which may be a stored chemical energy unit, a solar heater in a space systems application, or any of a variety of more conventional heat sources.

The schematic illustration of FIG. 3 shows a preferred embodiment of the CBC engine 14 in greater detail. A four-stage axial compressor 20 is connected in driven relation to a single-stage, axial gas generator turbine 22 via a tubular shaft 24. The output shaft 18 of the engine 14 is connected in driven relation to a single-stage axial power turbine 26. The output shaft 18 is coaxial with the tubular shaft 24 as indicated and extends outwardly from the engine to engage a traction-drive speed reducer 28 connected in driving relation to a propeller 30, pump jet, or other propulsor. The shafts 18, 24 are supported at the cold end by rolling-element bearings and at the hot end by gas bearings. Conventional engine ducting structure forms flow path segments 32-42. The ducting structure is intersecured with the compressor 20, turbines 22, 26, and three heat exchangers XCHG1, XCHG2, XCHG3, to form a closed-cycle, continuous flow path in which the working fluid flows in the direction indicated by the arrows (as at 44).

The first heat exchanger XCHG1 is a cooler having inlets 46, 48 and outlets 50, 52 for the working fluid and a coolant. The coolant is typically water and the heat exchanger XCHG1 is preferably a four-module, cross-flow, plate-fin unit. The working fluid enters the cooler from the third heat exchanger XCHG3 and exits to the compressor inlet 54.

The second heat exchanger XCHG2 is preferably a plate-fin unit operatively associated with a stored chemical energy system which includes the heat source 12. The heat source 12 is of a known type in which molten lithium is reacted with gaseous sulfur hexaflouride. Working fluid enters XCHG2 from the third heat exchanger XCHG3 and exits to the turbine inlet 56 as indicated.

The third heat exchanger XCHG3 is an annular recuperator that radially surrounds the engine core, and is preferably a pure-counterflow, plate-fin unit. Working fluid enters the recuperator from the compressor outlet 58 in the high-pressure section of the cycle and exits to XCHG2. The working fluid enters the recuperator from the turbine outlet 60 in the low-pressure section of the cycle and exits to the first heat exchanger XCHG1.

The engine 14 includes pressure vessels 62, 63 which are connected to permit selective access of two stored gasses to the flow path via electronically-controlled injection valves 64, 65.

The flow path and one of the pressure vessels 62 are charged with a first gas, and the pressure vessel 63 is charged with a second gas having a lower mean molecular weight than that of the first gas. Preferably, these are non-corrosive gases such as pure xenon (first gas) and pure helium (second gas).

Sensors S1, S2, S3 are installed in the engine 14 to monitor engine speed, compressor outlet pressure, and turbine inlet temperature. These are typically provided in the form of a proximity sensor, a pressure transducer, and a thermocouple, respectively. The sensors S1, S2, S3 are in electrical communication with a microcontroller 68 to provide the forementioned engine data thereto. The controller 68 is in electrical communication with the injection valves 64, 65, the heat source 12, and a gas storage compressor 69 to provide control signals thereto as needed. The heat source comprises an electronically-controlled injection valve (not shown) which responds to a control signal to govern the rate at which $SF_6$ is injected into the molten lithium bath. The compressor 69 is connected as shown to enable extraction of the first gas from the flow path as needed during the low-power operating condition.

In post-startup operation of the engine 14, the working fluid is heated in the third heat exchanger XCHG3 and is further heated in the second heat exchanger XCHG2 before entering the turbine inlet 56. The high-temperature working fluid is then expanded through the turbines 22, 26 to produce output power driving the compressor 20 and output shaft 18. Upon discharge from the turbine outlet 60, the working fluid is cooled first in the third heat exchanger XCHG3 and then in the first heat exchanger XCHG1 before entering the compressor inlet 54 as low-pressure working fluid. The low-pressure working fluid is pressurized in the compressor 20 and then flows to the third heat exchanger XCHG3, completing the continuous closed cycle.

In response to engine data derived from the sensors S1, S2, S3, the controller 68 regulates the injection valve of the heat source 12 so that heat is continuously added to the working fluid as needed to maintain the desired turbine inlet temperature. During a first operating condition in which the engine produces a 48-hp output, the working fluid is pure xenon gas of molecular weight 131.3 AMU. The inventory of the working fluid is regulated in a conventional manner during the first operating condition via the pressure vessel 62, check valve 67, compressor 69, injection valve 64, and controller 68. Small inventory adjustments are made to compensate for variables such as the effect of water temperature on torpedo drag. The desired rotational speed of the output shaft 18 is a stored datum in the controller 68. The controller 68 responds to differences between the desired speed and the actual speed communicated from S1 to transmit control signals 73 or 75 to injection valve 64 or compressor 69 in order to maintain the desired speed. The check valve prevents gas from leaking through the compressor 69 and into the flow path. Upon receiving a command signal 72 indicating a demand for high output power, the controller 68 responsively communicates a control signal 76 to the injection valve 65, initiating a running transition to a second operating condition. In response to the control signal, the injection valve 65 opens and helium is injected into the flow path, mixing therein with the xenon. Upon sensing a drop in temperature at the turbine inlet 56, the controller 68 responsively communicates a control signal 74 to the injection valve in the heat source 12, which increases the rate at which $SF_6$ is delivered to the molten lithium bath and consequently increases the rate at which heat is added to the xenon/helium mixture. The continued injection of helium into the flow path occurs in response to the control signals 76 and in accord with a schedule which depends on both the operational characteristics of the heat source 12 and the requirements of the particular application. The engine 12 cannot be optimized apart from the particular heat source to be employed in a particular application, because the pressure drop across the second heat exchanger XCHG2 affects engine configuration for a given cycle efficiency. In a modelled thermodynamic cycle analysis, the selected cycle efficiency was 35 percent for a pressure drop of 6.6 psi across the second heat exchanger XCHG2. Sufficient helium was injected into the flow path to yield a mean molecular weight of 20.2 AMU during the high-power operating condition in which the engine produced a 959 hp output. The system pressure level increased by a factor of 7.85 by introduction of the helium gas.

The increase from low power (first operating condition) to high power (second operating condition) is driven by two effects. One of these is an increase in system pressure level, and the other is a decrease in the molecular weight of the working fluid. It is instructive to consider these steps as if they occur in sequence, though in reality they occur together during transition. Considering first the system pressure level, increasing the pressure by a factor of 7.85 while maintaining molecular weight constant results in an increase in mass flow by a factor of 7.85. Neglecting Reynolds number effects, enthalpy changes across the cycle components are unchanged. Therefore, the output power varies directly with the mass flow rate. Considering next the decrease in mean molecular weight with system pressure level held constant, as the molecular weight is decreased, the specific heat of the working fluid rises, thus increasing enthalpy changes across the cycle components. For gasses with the same gamma quotient (ratio of specific heat at constant pressure to specific heat at constant volume)—again neglecting Reynolds number effects—the output power of the engine varies inversely with the square root of the mean molecular weight of the working fluid. By decreasing the mean molecular weight from 131.3 to 20.2, the output power is increased by a factor of 2.55. Combining the effect of increased pressure (yielding a 7.85—factor increase in power) with that of decreased mean molecular weight (yielding a 2.55—factor increase in power) yields the 20-fold increase from 48 hp to 959 hp.

By increasing output power in the above-described manner, there is a minimal difference in engine efficiency between the two operating conditions, since the engine components are operating at substantially equivalent design conditions at both power levels. Performance—critical properties such as flow angles and Mach numbers are substantially the same at both power levels, a result that is accomplished by suitably changing the rotational speed of the engine as the molecular weight of the working fluid changes.

The use of two gasses of different mean molecular weights in a CBC engine to accommodate two disparate levels of engine output power with minimal change in engine efficiency is what characterizes the invention in its broadest aspect. Therefore, it should be understood that although noble gasses are preferred for their property of non-corrosiveness, and although pure xenon and pure helium are more specifically preferred for power range, neither of these preferences is meant to limit the invention in its broadest aspect. The use of pure xenon as the first gas with pure helium as the second gas provides a mean molecular weight ratio of approximately 32.8, which is sufficient to meet the widely disparate output-power requirements for the contemplated application. However, in other or similar applications, the output-power requirements may not be as stringent, and the two selected gasses may then have a lower molecular weight ratio.

Accordingly the foregoing portion of the description, which description includes the accompanying drawings, is not intended to restrict the scope of the invention to the preferred embodiment thereof. The invention should be construed by reference to the following claims.

What is claimed is:

1. A process for operating a closed Brayton-cycle engine at relatively high efficiency under at least two markedly different conditions of engine output power by changing the inventory of a gaseous working fluid in a closed-cycle flow path, comprising the steps of:
   first, running the engine by continuously adding heat to and extracting heat from the working fluid during a first operating condition in which the engine produces relatively low output power and the working fluid is a first gas having a first mean molecular weight;
   second, effecting a running transition to a second operating condition in which the engine produces relatively high output power by:
   (a) injecting into the flow path a second gas having a second mean molecular weight lower than the first mean molecular weight, whereby the working fluid becomes a mixture of the first and second gases and has a third mean molecular weight lower than the first mean molecular weight; and
   (b) adding heat to the working fluid at a rate which maintains the working fluid at a substantially constant turbine inlet temperature.

2. A process as recited in claim 1 wherein the ratio of the first mean molecular weight to the third mean molecular weight is at least 5:1.

3. A process as recited in claim 1 wherein the first gas comprises a noble gas.

4. A process as recited in claim 3 wherein the first gas comprises xenon.

5. A process as recited in claim 3 wherein the second gas comprises helium.

6. A process as recited in claim 1 wherein the second gas comprises helium.

7. A process as recited in claim 1 wherein the ratio of the first mean molecular weight to the second mean molecular weight is less than 33.0.

8. A process as recited in claim 7 wherein the ratio of the first mean molecular weight to the third mean molecular weight is at least 5:1.

9. A process as recited in claim 8 wherein the first gas comprises xenon and the second gas comprises helium.

10. A process as recited in claim 1 wherein each of the first and second gasses comprises a noble gas.

11. A closed Brayton-cycle engine, comprising:
    a compressor for a working fluid to be compressed therein so as to form a compressed working fluid,
    a heat exchanger connected to be in fluid communication with said compressor for receiving and heating said compressed working fluid so as to form a hot compressed working fluid,
    a turbine connected to be in fluid communication with said heat exchanger for receiving said hot compressed working fluid and providing mechanical power in response to expansion of said hot compressed fluid therethrough so as to form an expanded hot working fluid,
    another heat exchanger connected to be in fluid communication with said turbine for receiving and cooling said expanded hot working fluid, and connected to be in fluid communication with said compressor so as to form a continuous-cycle flow path,
    wherein said working fluid is comprised of a first gas of a first mean molecular weight, and
    means operable to access said flow path for supplying thereto as a component of said working fluid a second gas of a second mean molecular weight which is less than said first mean molecular weight.

12. A closed Brayton-cycle engine as set forth in claim 11, wherein said means for suppling said second gas comprises:
    a pressure vessel containing said second gas and connected so as to be operable to enable fluid communication of said second gas from said vessel to said continuous-cycle flow path.

13. A closed Brayton-cycle engine as set forth in claim 12, wherein said means for suppling said second gas further includes:
    an injection valve connected between said pressure vessel and said continuous-cycle flow path so as to be operable to enable fluid communication of said second gas from said vessel to said continuous-cycle flow path.

14. A closed Brayton-cycle engine as set forth in claim 13, further including:
    a second pressure vessel containing said first gas and connected so as to be operable to enable fluid communication of said first gas between said second vessel and said continuous-cycle flow path.

15. A closed Brayton-cycle engine as set forth in claim 11, wherein said first gas is a noble gas.

16. A closed Brayton cycle engine as set forth in claim 15, wherein said second gas is a noble gas.

17. A closed Brayton-cycle engine as set forth in claim 11, wherein said second gas is helium.

18. A closed Brayton-cycle engine as set forth in claim 17, wherein said first gas is xenon.

19. A closed Brayton-cycle engine as set forth in claim 11, wherein said first mean molecular weight is less than 33 times said second mean molecular weight.

20. A closed Brayton-cycle engine as set forth in claim 19, wherein said second gas is helium.

* * * * *